United States Patent [19]

Simmons

[11] Patent Number: 4,942,809
[45] Date of Patent: Jul. 24, 1990

[54] COOKING JACKET

[76] Inventor: Elsie A. Simmons, Rte. 1, Box 253-B, Charlotte Hall, Md. 20622

[21] Appl. No.: 302,303

[22] Filed: Jan. 26, 1989

[51] Int. Cl.$^5$ ............................................. A47J 43/18
[52] U.S. Cl. ....................................... 99/426; 99/449; 99/450; 383/117; 426/132
[58] Field of Search ................. 99/426, 449, 450, 495; 426/110, 113, 523, 132, 129; 383/8, 102, 117, 118

[56] References Cited

U.S. PATENT DOCUMENTS

| 2,514,098 | 7/1950 | Shreiner | 99/426 X |
| 2,973,218 | 2/1961 | Schaum | 99/426 X |
| 3,292,831 | 12/1966 | Moen | 99/426 X |
| 4,753,538 | 6/1988 | Jordá383 | 117 X/ |

FOREIGN PATENT DOCUMENTS

| 49198 | 8/1934 | Denmark | 99/426 |
| 829727 | 7/1938 | France | 383/117 |
| 2441559 | 7/1980 | France | 426/523 |
| 247673 | 2/1926 | United Kingdom | 99/449 |

Primary Examiner—Harvey C. Hornsby
Assistant Examiner—Stephen F. Gerrity

[57] ABSTRACT

A jacket for use in cooking large pieces of meat, turkeys, chickens, roasts and the like and is in the form of a mesh member having handle forming loops at each end to enable the turkey or other piece of meat to be retained in a jacket structure and easily lifted from the cooking pan, pot, vessel or the like. The jacket is constructed of a plastic material that is of one piece construction thereby eliminating seams which form areas of weakness with the mesh material enabling the cooking fluids to remain in the pan when the turkey, chicken or other large piece of meat is removed thereby saving all of the drippings for making gravy or other uses.

3 Claims, 1 Drawing Sheet

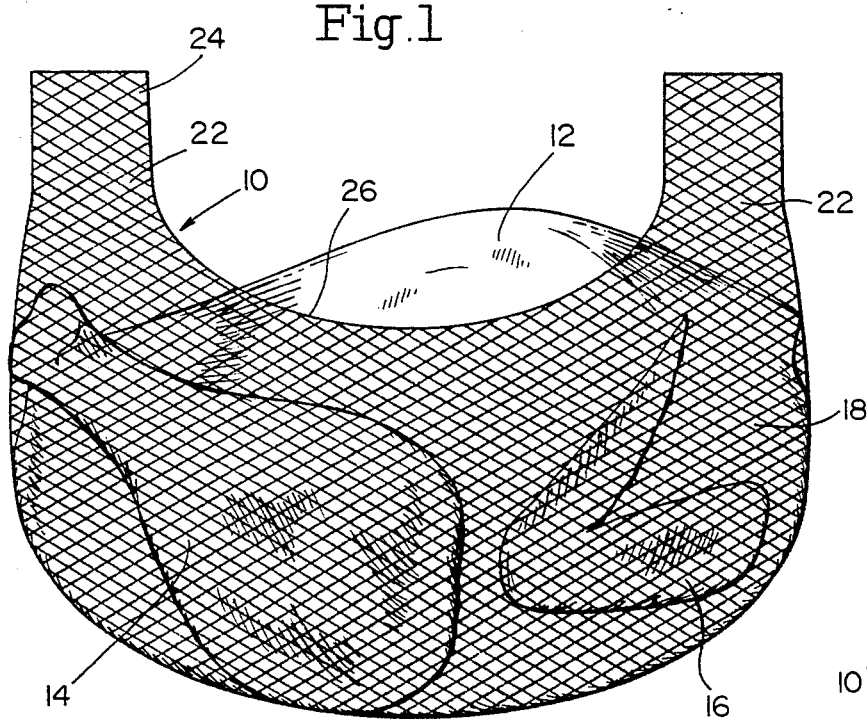
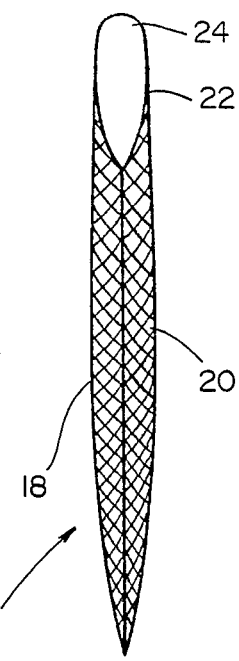
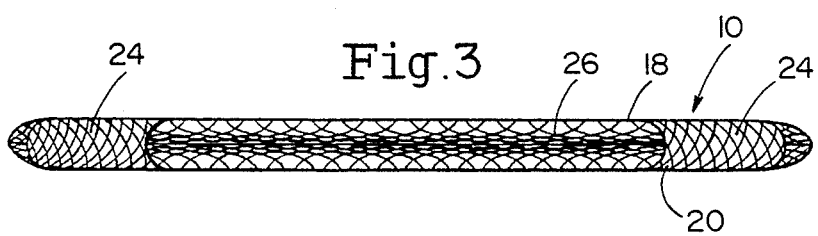
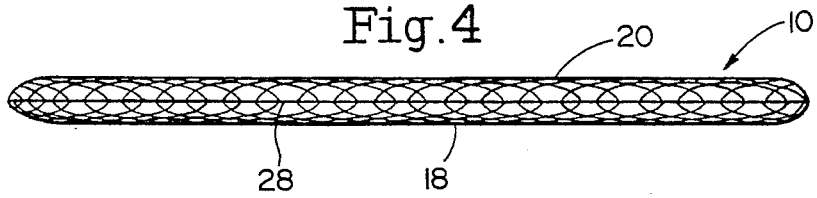
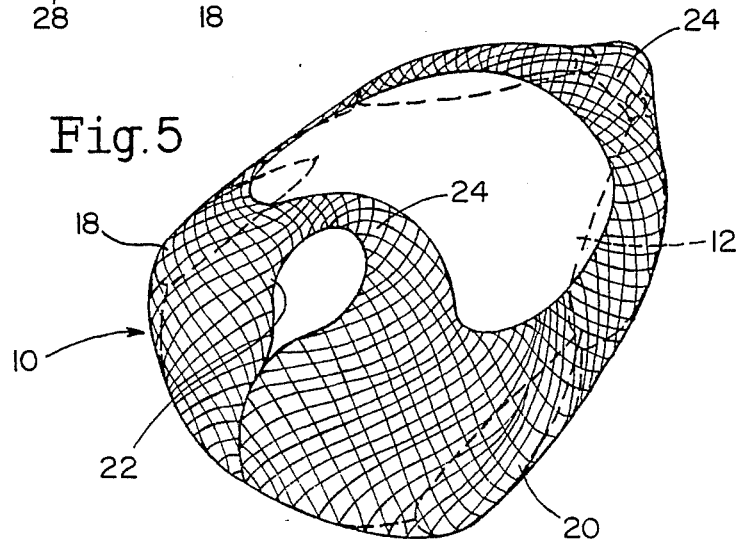

COOKING JACKET

BACKGROUND OF THE INVENTION

Field of the Invention

The present invention generally relates to a jacket for use in cooking large pieces of meat, turkeys, chickens, roasts and the like and is in the form of a mesh member having handle forming loops at each end to enable the turkey or other piece of meat to be retained in a jacket structure and easily lifted from the cooking pan, pot, vessel or the like. The jacket is constructed of a plastic material that is of one piece construction thereby eliminating seams which form areas of weakness with the mesh material enabling the cooking fluids to remain in the pan when the turkey, chicken or other large piece of meat is removed thereby saving all of the drippings for making gravy or other uses.

Information Disclosure Statement

When cooking meat, especially turkeys, large chickens, roasts and the like, it is difficult to remove the meat from the cooking pan and place it on a serving dish such as a platter. This is especially problematical when trying to lift a large turkey from a roasting pan onto a platter. Frequently, large forks, spatulas and the like are inserted from opposite sides of the turkey with the turkey then being lifted. This frequently results in a portion of the turkey remaining in the pan, the legs and wings becoming disconnected and sometimes results in the pan being lifted along with the turkey. Such problems cause a dangerous situation since hot grease can be deposited on a stove or on the person lifting the turkey and frequently the removal of a turkey or large roast requires the services of a second person to stabilize the pan while lifting the piece of meat therefrom. The use of various ancillary containers for cooking purposes does not serve this problem.

SUMMARY OF THE INVENTION

An object of the present invention is to provide a cooking jacket constructed of mesh material that is non-meltable and will not stick to the product being cooked with the jacket being in the form of a container having an open top and handle forming loops at each end with the container being of a size to substantially fully enclose the turkey or large piece of meat although the top of the container is open to provide access thereto when desired.

Another object of the invention is to provide a jacket in accordance with the preceding object which can easily and quickly lift the turkey, large chicken or other meat from the pan in which it is cooked with the jacket serving to provide a stable support for safely and quickly handling the turkey or large piece of meat so that it can be easily lifted from the pan and placed on a serving dish, platter or the like.

A further object of the invention is to provide a jacket in accordance with the preceding objects in which the mesh material from which the device is constructed is stretchable in one direction but not in the other thereby enabling the girth of the jacket to increase to accommodate various sizes of edible products to be cooked in the jacket.

Still another important object of the present invention is to provide a cooking jacket for turkeys, chickens, roasts or other large pieces of meat to facilitate the removal of the cooked product from the pan in which it was cooked with the jacket being constructed of a mesh plastic material which has no seams to pull apart and can be used in a microwave as well as a conventional oven, will not stick to the meat, will not melt, will retain the wings and legs of a turkey in place when being removed from the pan, enabling the turkey or other product to be browned in a conventional manner, will retain all the gravy drippings in the pan and facilitate lifting of the turkey or other piece of meat without any mess and with less effort with the jacket being washable for reuse and constructed in different sizes for use with different types of edible products to be cooked.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the cooking jacket of the present invention illustrating its association with a turkey in a manner that illustrates the turkey being substantially completely enclosed by the jacket.

FIG. 2 is an end elevational view of the cooking jacket.

FIG. 3 is a plan view of the cooking jacket.

FIG. 4 is a bottom view of the cooking jacket.

FIG. 5 is a perspective view of the cooking jacket illustrating its association with a turkey.

DESCRIPTION OF THE PREFERRED EMBODIMENT

Referring now specifically to the drawings, the cooking jacket of the present invention is generally designated by reference numeral 10 and, as illustrated, is adapted for use in cooking a turkey 12. It is pointed out that other large meat products may be used with the jacket such as large chickens, roasts and the like. As illustrated, the jacket 10 substantially completely encloses the turkey 12 and will retain the legs 14 and wings 16 of the turkey in place while being cooked and when lifting the turkey 12 from the cooking pan.

The jacket 10 is constructed of a mesh plastic material and includes two side panels 18 and 20 with each of the side panels having a continuous upward extension 22 forming handle loops 24 at each end thereof through which a finger can be inserted to lift the turkey from the pan. As illustrated in FIGS. 1 and 5, the area between the loops 24 is recessed at 26 so that the upper portion of the turkey 12 is exposed and accessible between the handle forming loops 24. While the side panels 18 and 20 are designated as separate components, they actually are in the form of a one-piece structure having a line of demarkation 28 as illustrated in FIGS. 2-4. Thus, the jacket is closed around the bottom and closed around each end except for the end loops 24 with the upper portion of the jacket being cut out and defined by the recess 26. When using the cooking jacket 10, the turkey 12 or other meat product is placed through the open recess 26 into the jacket which forms a container or sling generally in the form of a tray which retains the turkey securely in place with the two ends of the jacket extending upwardly along the ends of the turkey with the extensions 22 and the loop handles 24 enabling the turkey to be easily handled when placing it in the cooking pan. The jacket does not interfere with the cooking operation and the turkey can be basted and after it has been cooked, the turkey can be easily lifted from the cooking pan while all of the cooking juices, drippings and the like are left in the pan for use in making gravy or for whatever purpose is desired.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, a cooking jacket and a meat product, said meat product producing drippings when being cooked and having dimensions and weight characteristics which render it difficult to handle and manipulate by conventional kitchen utensils when being cooked in a conventional manner, said cooking jacket comprising a one-piece mesh contained dimensioned to receive and closely fit the meat product, said container including two side panels, each of said side panels having a continuous upward extension adjacent each end thereof to form longitudinally spaced handle loops, said mesh container having a large opening in the area between the handle loops to enable said meat product to be inserted into and removed from the container and providing access to an upper portion of the meat product when being cooked, said mesh container being continuous around a bottom portion and around both end portions thereof and being constructed of plastic mesh that is flexible, non-meltable at cooking temperatures of the meat product, said mesh container having a lengthwise dimension longer than a transverse dimension to form a sling when the container is supported by lifting the handle loops with the mesh enabling drippings produced when cooking the meat product to remain in a cooking pan when the container with the cooked meat product therein is lifted out of the cooking pan.

2. The combination as defined in claim 1 wherein said meat product is a fowl having wings and legs appended to a main body, said side panels of the mesh container overyling the wings and legs and retaining them adjacent the main body during cooking and handling of the fowl.

3. A cooking jacket for a meat product which produces drippings when being cooked and having dimensions and weight characteristics which render is difficult to handle and manipulate by conventional kitchen utensils when being cooked in a conventional manner, said cooking jacket comprising a one-piece mesh container adapted to receive and closely fit the meat product, said container including two side panels, each of said side panels having a continuous upward extension adjacent each end thereof to form longitudinally spaced handle loops, said mesh container having a large opening in the area between the handle loops adapted to enable said meat product to be inserted into and removed from the container and provide access to an upper portion of the meat product when being cooked, said mesh container being continuous around a bottom portion and around both end portions thereof and being constructed of plastic mesh that is flexible, non-meltable at cooking temperatures of the meat product, said mesh container having a lengthwise dimension longer than a transverse dimension to form a sling when the container is supported by lifting the handle loops with the mesh enabling drippings produced when cooking a meat product to remain in a cooking pan when the container with the cooked meat product therein is lifted out of the cooking pan.

* * * * *